United States Patent
Adogla

(10) Patent No.: US 9,454,493 B1
(45) Date of Patent: Sep. 27, 2016

(54) SYSTEMS AND METHODS FOR WIPED STORAGE DEVICES

(75) Inventor: Eden G. Adogla, Seattle, WA (US)

(73) Assignee: Amazon Technologies, Inc., Reno, NV (US)

( * ) Notice: Subject to any disclaimer, the term of this patent is extended or adjusted under 35 U.S.C. 154(b) by 762 days.

(21) Appl. No.: 13/464,448

(22) Filed: May 4, 2012

(51) Int. Cl.
*G06F 12/00* (2006.01)
*G06F 12/14* (2006.01)

(52) U.S. Cl.
CPC ....... *G06F 12/14* (2013.01); *G06F 2221/2143* (2013.01)

(58) Field of Classification Search
CPC .................. G06F 12/00; G06F 2221/2143
USPC ....................................................... 711/166
See application file for complete search history.

(56) References Cited

U.S. PATENT DOCUMENTS

| | | | |
|---|---|---|---|
| 2006/0158940 A1* | 7/2006 | Shappir et al. | 365/185.29 |
| 2007/0253256 A1* | 11/2007 | Aritome | 365/185.24 |
| 2010/0306577 A1* | 12/2010 | Dreifus et al. | 714/6 |
| 2011/0055588 A1* | 3/2011 | DeHaan | 713/189 |
| 2012/0206972 A1* | 8/2012 | Shiino et al. | 365/185.19 |

OTHER PUBLICATIONS

Extremetech (Tech Myth #2 Quick Format vs. Full Format, published on Sep. 3, 2008, Ziff Davis, pp. 1-5).*

* cited by examiner

*Primary Examiner* — Adam M Queler
*Assistant Examiner* — Kenneth Tsang
(74) *Attorney, Agent, or Firm* — Sutherland Asbill & Brennan LLP

(57) ABSTRACT

Systems and methods for verifying the wiping of a storage device using one of either a partial scan verification or a full scan verification, wherein a partial scan verification may be conducted based on at least one metric associated with the storage device and a threshold value for the at least one metric.

27 Claims, 4 Drawing Sheets

SYSTEMS AND METHODS FOR WIPED STORAGE DEVICES

BACKGROUND

With increasing availability of inexpensive communications bandwidth, remote computing or cloud computing, where processing and storage resources may be located remotely from the point of usage of the processing and storage resources, has become more widely available. Third party entities may offer these remote computing resources to organizations and individual users when the third party entities are located remotely with respect to the organizations and users. Remote computing methods may, therefore, enable an organization to outsource its information technology needs to an outside vendor and allow the outside vendor to provide processing and storage resources, as well as maintenance, information security, scalability, reliability, and the like.

The third party providers of the remote computing resources may, in turn, make relatively effective use of computing resources by centralizing the resources and providing computing resources to multiple organizations and users. In so doing, remote computing providers may have a plurality of computers or servers and a plurality of storage devices to meet the computing and storage needs of the multiple organizations and/or individuals for whom the remote computing providers provide service. The remote computing resources, and in particular, computing storage capacity that is used by one organization or user, may subsequently be provided to another organization or user by the providers of the remote computing resources. When providing the storage capacity to a new user or organization, for various reasons including data security, the storage capacity may need to be reliably wiped or erased. It may also be necessary to verify that the storage capacity has been reliably wiped or erased prior to letting new users access the storage capacity. In some cases, verifying that the storage capacity has been reliably wiped or erased may be time-consuming and may use computing, energy, or other resources.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items; however, various embodiments may utilize elements and/or components other than those illustrated in the figures.

DETAILED DESCRIPTION

Overview

Figure 1:
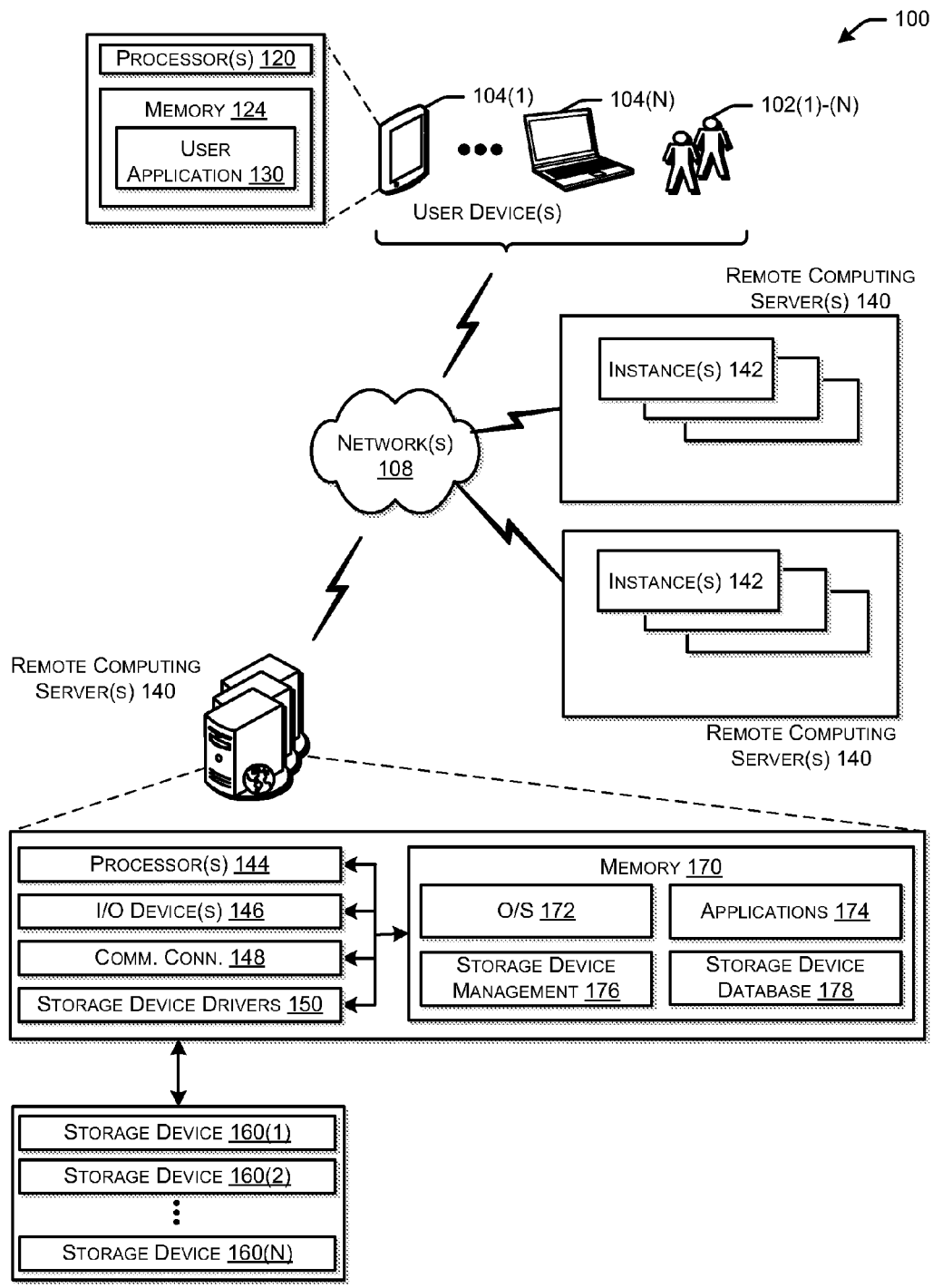
FIG. 1 is a schematic diagram that illustrates an example architecture for providing remote computing services, in accordance with embodiments of the disclosure.

Embodiments of the present disclosure are directed to, among other things, providing computing resources, and particularly computing storage capacity and resources remotely. Storage capacity may be provided remotely to a first organization or user. This storage capacity may be leased or rented to the organization or user and may be provided from one or more storage devices located at or near the provider of the remote computing resources. The storage capacity may be returned by the first organization or user by, for example, no longer renting or leasing the storage capacity or portions thereof. The provider of the remote computing resources may provide the storage capacity, or portions thereof, to another organization or user. Before providing the storage capacity to the new organization or user, the provider of the remote computing resources may erase the storage capacity by erasing all of the storage devices associated with the storage capacity and subsequently verifying that the storage capacity has been sufficiently erased. It may be beneficial to erase the storage capacity, for example, to prevent data and information associated with the first organization or user from being available or retrievable by the next or subsequent organizations or users of that storage capacity. Not adequately erasing the storage capacity may have implications related to information security, information theft, and sharing of proprietary, confidential, and/or personal information. Erasing and verifying that the storage capacity has been erased may be time-consuming in certain cases and may, therefore, delay offering the storage capacity to subsequent users, resulting in the potential reduction of utilization and revenue realization from the storage capacity. In certain embodiments of the disclosure, one or more storage devices associated with the storage capacity may be partially scanned to verify wiping and, therefore, saving time and other resources during the wiping verification process.

Storage capacity, as used herein, may refer to any form of electronic storage that may be used and/or that may be available to a particular organization or individual user to store electronic information or data. The information or data may be in any form of analog or digital data. In certain embodiments, digital data storage capacity may be offered by the provider of remote computing resources. Electronic information or data stored on the storage capacity may include, but is not limited to, computer files, documents, audio files, video files, other media files, computer programs, applications or scripts, files containing proprietary, confidential, personal or sensitive information, or combinations thereof.

It will further be appreciated that the storage capacity provided to a particular organization or individual user may include one storage device, portions of a storage device, more than one storage device, and/or more than one portion of storage devices. For example, if a particular user requires 10 terabytes (Tb) of storage capacity, then the provider of the remote computing resources may allocate five 2 Tb hard disk drives (HDDs) to provide the full 10 Tb requirement. Alternatively, the 10 Tb capacity may be provided using three 3 Tb HDDs and 1 Tb of a 3 Tb HDD. The storage devices, or portions thereof that provide the storage capacity to the organization or user of the remote computing resources may be of any suitable type of data storage or mass storage device with any suitable storage capacity. The storage devices may be, for example, any combinations of (HDDs) of any format and interface(s), optical storage drives, opto-magnetic storage drives, compact disc (CD) drives, digital video disc (DVD) drives, solid state storage drives, flash memory drives, or the like.

The storage devices, such as HDDs, may further have a plurality of segments of predefined storage sizes. For the purposes of the discussion herein, the segments may be referred to as blocks, sectors, or segments, interchangeably. In certain embodiments of the disclosure, the process of erasing and verifying the erasing may be conducted on a block-by-block basis. In other words, a block may be the smallest subdivision of a particular storage capacity and storage device(s) associated therewith that may be erased and verified for erasure in certain embodiments of the disclosure. In other embodiments of the disclosure, portions of a block may be erased and the erasure of that portion of the block may be verified. A block may be of any suitable size, such as 512 bytes or 4,096 bytes.

In certain embodiments of the disclosure, when storage capacity is received back from a leaser or renter of the storage capacity, the storage capacity, and the associated storage devices or portions thereof, may be identified using a variety of identifiers to identify the particular storage devices and determine the type or class of storage device. The storage capacity and associated storage devices may be wiped or erased, and during wiping of the storage devices, metrics associated with the storage capacity may be measured or collected. The metrics collected may include any variety of data including, but not limited to, erase speeds, access times, read times, and the like. Based, at least in part, on the collected metrics, it may be determined if the storage capacity or constituent storage devices are potentially damaged. If there is a potential of damage in any of the constituent storage devices of the storage capacity, then a detailed inspection of the potentially damaged storage devices may be conducted. If the storage devices do not show a potential or likelihood of damage, then it is determined if the storage capacity is sufficiently wiped. If the storage capacity is sufficiently wiped, then the storage capacity, or portions thereof, may be provided to a new organization or user. If the storage capacity is not sufficiently wiped, then the storage capacity or portions thereof may be further subjected to wiping or rewiping.

The process of confirming or verifying the wiping or erasing of the storage capacity may be a time-consuming event and, therefore, may consume relatively high levels of resources. Accordingly, partial scanning verification, or spot checking of the wiping process, may be performed for the storage capacity in accordance with embodiments of the disclosure. The procedure for determining if a particular storage capacity or storage device may be partially scanned for verification of the wiping or zeroing process may, in one aspect, involve considering the metrics measured during the wiping process, as well as the metrics associated with the storage capacity, which may be stored in a storage device database. The determination of whether a particular device may be partially scanned may further involve accessing and considering data associated with an identified storage device cluster or bin with which the storage device is associated.

In certain embodiments, the storage device cluster associated with the storage device may be determined based on the identification of the storage device and metrics associated with the storage device cluster, which may be retrieved from a storage device database. Additionally threshold values or conditions associated with the storage device measured metrics and the cluster may be retrieved from the storage device database. One or more of the metrics may be compared to corresponding respective threshold values or threshold conditions. A comparison may then be used, at least in part, to determine if the storage device should be subjected to a full scan or a partial scan. Other considerations, such as verification of execution capacity constraints may also be considered, at least in part, in determining if a full or partial scan of the storage capacity should be conducted to verify if the storage device has been sufficiently wiped. If a partial scan of the storage device is performed, then measurements related to the health of the storage device may be collected during the verification step. If the measurements during the verification do not show signs of ill health, then the wiping verification may result in a determination of whether the storage device was sufficiently wiped. The storage device database may be updated based upon the process of wiping and verifying the storage device.

This brief introduction, including section titles and corresponding summaries, is provided for the reader's convenience and is not intended to limit the scope of the claims nor the preceding sections. Furthermore, the techniques described above and below may be implemented in a number of ways and in a number of contexts. Several example implementations and contexts are provided with reference to the following figures, as described below in more detail. However, the following implementations and contexts are but a few of many.

Illustrative Architecture

FIG. 1 depicts an illustrative system or architecture 100 in which techniques for providing remote computing services and/or remote data storage may be implemented. In the architecture 100, one or more users 102(1)-(N) may utilize user computing devices 104(1)-(N) (collectively, user devices 104) that include one or more processors 120 communicatively coupled to one or more memories 124 (herein referred to memory 124), to execute one or more applications 130 or software instructions. The one or more applications 130 may be stored on the memory 124 and accessed by the processors 120 from the memory 124. The user devices 104 may further be configured to communicate via one or more networks 108 with one or more remote computing server(s) 140 (herein referred to as remote computing servers 140).

The user 102, as used herein, may refer to either an organization or a user. The organization may be a company, a non-profit organization, a for-profit organization, a religious organization, a community organization, a government agency, or the like. The user devices 104 may be any variety of computing devices including, but not limited to, servers, desktop computers, notebook computers, netbook computers, tablet computing devices, pad computing devices, personal digital assistants (PDAs), smart phones, digital readers, or combinations thereof. In some cases, the user devices 104 may be "intelligent devices" that may execute one or more programs and applications 130 locally on the processor 120. In other cases, the user devices 104 may be "dumb terminals" configured to primarily execute software, programs, or applications 130 related to serving, displaying, or otherwise rendering information or content provided from sources external to the user device 104, such as from the remote computing servers 140. Indeed, the architecture 100 may include both "intelligent devices" and/or "dumb terminals." Furthermore, the architecture may include a variety of user device types. For example, there may be multiple users 102 each accessing the remote computing servers 140 via different types of user devices 104. In one aspect, the remote computing servers 140 may run virtual machine instances 142, hereinafter referred to as instances 142. Each of these instances 142 may be provided to a different organization or user. In effect, multiple instances 142 of computing resources and storage capacity may be allocated from a single remote computing server 140 or group of servers 140. Therefore, when computing resources and/or storage resources are provided to a user 102 a new instance 142 may be launched on the computing servers 140. When a user returns the computing resources and/or the storage capacity, the instance 142 associated therewith may be terminated.

The one or more applications 130 may be run on the user device 104 to process files and data locally on the user device 104. The files and data may in one aspect be saved locally on the user device 104, such as in memory 124, or be transmitted to the remote computing servers 140 to be stored thereon, or both. As an example, consider that a user 102 opens and processes a spreadsheet file. The spreadsheet file may be opened locally on the user device 104 using a spreadsheet application corresponding to the spreadsheet file. After a user 102 manipulates the spreadsheet file on the user device 104, the user 102 may choose to save the spreadsheet file locally on the user device 104, send the file to the remote computing servers 140 for storage, or both. In certain embodiments, the user 102 may access and use remote applications that may be run remotely from the user device 104, such as at the remote computing servers 140. For example, a user 102 may open and manipulate a word processing file, and the word processing application program with which the user 102 interacts may be executed on the remote processing servers 140. Therefore, the word processing file may be stored, accessed, and manipulated remotely from the user device 104. The user device 104 may have one or more applications 130 running thereon that may render the operation of the word processing program on a user display or user interface of the user device 104. In one aspect, the applications 130 may be configured to receive data from the remote computing servers 140 via the network 108 and render the received data for display to the user 102. The applications 130 may further receive user input on the user device 104 and convey the input to the remote computing servers 140 via the network 108. Other non-limiting interactions between the user device 104 and the remote computing servers 140 may include executing applications on the remote computing servers 140 and storing files and data on the user device 104, or storing the files or data at both the remote computing servers 140 and locally, and executing the applications that use the files or data at the remote computing servers 140.

The networks 108 may include any one or a combination of different types of suitable communications networks, such as cable networks, the Internet, wireless networks, cellular networks, and other private and/or public networks. Furthermore the networks 108 may include any variety of medium over which network traffic is carried including, but not limited to, coaxial cable, twisted wire pair, optical fiber, hybrid fiber coaxial (HFC), microwave terrestrial transceivers, radio frequency communications, satellite communications, or combinations thereof. While the illustrated example represents the users 102 accessing the remote computing servers 140 over the networks 108 using the user device 104, it will be appreciated that the users 102 may access one or more other elements via the network 108. It is also noted that the described techniques may apply in other client/server arrangements (e.g., set-top boxes, etc.), as well as in non-client/server arrangements (e.g., locally stored software applications, etc.).

The remote computing servers 140 may be any type of server, computer, or computing devices such as, but not limited to, mobile, desktop, thin-client, servers, minicomputers, blade servers, supercomputers and/or cloud computing devices. In certain embodiments, the remote computing servers 140 may include one or more servers or computers, perhaps arranged in a cluster, as a server farm, or as individual servers not associated with one another. These remote computing servers 140 may be configured to receive, store, and/or process information associated with interactions with the user devices 104. In addition, the remote computing servers 140 may be configured to process data and files received from the user devices 104 and store the data and files remotely from the user devices 104. Yet further, the remote computing servers 140 may be configured to provide computing and/or data processing capability to users 102 via their user devices 104 remotely over the network 108.

In one illustrative configuration, the remote computing servers 140 may include one or more processing units (or processor(s)) 144. In some examples, the processor(s) 144 of the remote computing servers 140 may be implemented as appropriate in hardware, software, firmware, or combinations thereof. Software or firmware implementations of the processor(s) 144 may include computer-executable or machine-executable instructions written in any suitable programming language to perform the various functions described. Hardware implementations of the processor(s) 144 may be configured to execute computer-executable or machine-executable instructions to perform the various functions described. The processors 144 may include, but are not limited to, one or more of microprocessors, multi-core processors, microcontrollers, field programmable gate arrays (FPGAs), digital signal processors (DSPs), application-specific integrated circuits (ASICs), or combinations thereof.

The remote computing servers 140 may further include input/output (I/O) device(s) 146, such as a keyboard, a mouse, a pen, a voice input device, a touch input device, a display, speakers, a printer, etc. The remote computing servers 140 may also include communications connection(s) 148 that allow the remote computing servers 140 to communicate with stored databases, other computing devices or servers, user terminals, and/or other devices on the networks 108.

The remote computing servers 140 may yet further include one or more storage device drivers 150 for controlling one or more storage devices 160(1)-(N), herein collectively referred to as storage devices 160. The storage device drivers 150 may cooperate with the processor 144 to read and write information to the storage devices 160. In one aspect, the remote computing server 140 may provide storage capability remotely to users 102 and user devices 104 by providing users 102 access to the storage devices 160 via the processors 144 and the storage device drivers 150.

The storage devices 160 may be of any suitable type of non-volatile or volatile storage device. Any suitable physical mechanism for data storage may be used for storing data on the storage devices 160 including, for example, magnetic, optical, or electrical charge mechanisms for storing data. Types of storage devices 160 may include, for example, any combinations of hard disk drives (HDDs) of any format and interface(s), optical storage drives, opto-magnetic storage drives, compact disc (CD) drives, digital video disc (DVD) drives, solid state storage drives, flash memory drives, or the like.

During operation, the processors 144 may be configured to receive instructions from the user devices 104 via the network 108 and based at least in part on the instructions may access the storage devices 160 to retrieve data from the storage devices 160 or store data thereon. In other words, a user 102 via the user device 104 may attempt to access particular information that is stored remotely on the storage devices 160 to be rendered on or otherwise utilized by the user device 104. Responsive to the attempt, the user device 104 and applications 130 running thereon may send instructions to the processors 144 to provide the requested information. The processors 144 may determine where the requested information is stored, such as the particular storage devices 160(1)-(N) on which the information is stored and blocks on the particular storage devices 160(1)-(N). The processors 144 may further invoke the storage device drivers 150 to fetch the requested information from the storage devices 160. The processors 144 may then transmit the information to the user device 104 via the network 108. Similarly, the user device 104 may transmit information or data for storage to the remote computing servers 140 via the network 108, and the information or data may be received by the processors 144. The processors 144 may then invoke the storage device drivers 150 to store the data on the storage devices 160.

The remote computing servers 140 may further include one or more memories 170, herein referred to as memory 170. The memory 170 may store program instructions that are loadable and executable on the processor(s) 144, as well as data generated during the execution of these programs. Depending on the configuration and type of remote computing servers 140, the memory 170 may be volatile (such as random access memory (RAM)) and/or non-volatile (such as read-only memory (ROM), flash memory, etc.). In some implementations, the memory 170 may include multiple different types of memory, such as static random access memory (SRAM), dynamic random access memory (DRAM), and/or ROM.

The memory 170 and/or the storage devices 160, both removable and/or non-removable, are all examples of computer-readable storage media. For example, computer-readable storage media may include volatile and non-volatile, removable and non-removable media implemented in any method or technology for storage of information such as computer-readable instructions, data structures, program modules, and/or other data.

Turning to the contents of the memory 170 in more detail, the memory 170 may include an operating system module 172, one or more application programs or applications 174, a storage device management module 176, and a storage device database module 178. Each of the modules and/or software may provide functionality for the remote computing servers 140, when executed by the processors 144. The modules and/or the software may or may not correspond to physical locations and/or addresses in the memory 170. In other words, the contents of each of the modules may not be segregated from each other and may, in fact, be stored in at least partially interleaved positions on the memory 170.

The operating system module 172 may have one or more operating systems stored thereon. The processors 144 may be configured to access and execute one or more operating systems stored in the operating system module to operate the system functions of the remote computing servers 140. System functions, as managed by the operating system, may include memory management, processor resource management, driver management, application software management, system configuration, and the like. The operating system may be any variety of suitable operating systems including, but not limited to, Microsoft® Windows®, Microsoft® Windows® Server®, Linux, Apple® OS X®, or the like.

The applications 174 may include any variety of application software that may be executed in conjunction with the operating system that the processor 144 may be utilizing for the remote computing servers 140. The applications 174 may include any variety of software that may be utilized for any purpose. For example, the applications 174 may include, but not be limited to, drawing programs, image processing programs, audio processing programs, word processing, spreadsheet programs, database management programs, enterprise resource planning programs, presentation programs, personal finance programs, tax preparation programs, accounting programs, statistical analysis programs, computer-aided manufacturing programs, computer-aided design programs, games and entertainment programs, educational programs, webviewers, or combinations thereof.

In certain embodiments, the applications 174 may be executed on the processors 144 on behalf of a user 102 accessing an application via the user device 104 and the network 108. In other words, the user may access his/her user device 104, and the processor 120 thereon may communicate with the processors 144 of the remote computing servers 140 and instruct the processors 144 to execute a particular application using the resources of the remote computing servers 140 for the benefit of the user. Responsive to the instructions, the processors 144 may launch and/or execute the particular application, or a portion thereof, and may communicate data associated therewith, for example, to render any user output on the user device 104 or to accept any user input from the user device 104, and to communicate the input to the application, via the processor 120, the network 108, and the processors 144. Therefore, a user 102 may be able to control, use, and interact with an application 174 running on the remote computing servers 140 from a remote location, such as at the user device 104 location.

The memory 170 may further include a storage device management module 176. The storage device management module 176 and code stored thereon may be executed by the processor 144 to provide operations for distributing and managing storage capacity to users 102 and user devices 104. In other words, the instructions and programs stored on the storage device management module 176 may enable the processor 144 to manage and track the allocation of individual storage devices 160(1)-(N), or portions thereof, to provide storage capacity required by the user 102 of remote computing services as provided by the remote computing servers 140. For example, if the remote computing servers 140 are used by three different remote clients, such as users 102, and each user 102 has a particular allocation of storage capacity, then the instructions and programs stored on the storage device management module 176 may function in allocating, segregating, and otherwise managing the storage capacity of each of the three clients. The storage device management module 176 may further cooperate with the processors 144 to track and allocate the individual storage devices 160(1)-(N) to particular users 102 based on the user's requirements and needs while fulfilling the users' 102 storage capacity needs. For example, consider that a preexisting user 102 requests an additional quantum of storage capacity to meet his/her expanding data storage needs. The storage device management module 176 may determine which of the individual storage devices, or portions thereof, to allocate to the user 102 to meet his/her storage capacity requirements based on one or more factors. Factors that may be considered by the instructions stored in the storage device management module 176 and used for allocation of individual storage devices 160(1)-(N) may include access times, seek times, data throughput rates, reliability, availability of non-fragmented continuous blocks, and the like. In one aspect, the storage device management module 176 may have instructions stored thereon to attempt to allocate storage capacity in a fashion where the allocation is as non-fragmented as possible among multiple users 102 of the remote computing servers 140. In another aspect, the storage device management module 176 may have instructions stored thereon to track changes to the allocation of storage capacity to different clients and users 102. In yet another aspect, the storage device management module 176 may have instructions stored thereon to prevent users from accessing storage capacity allocated to other users or to otherwise prevent users from accessing storage capacity that they are not authorized to access.

The memory 170 may further include a storage device database module 178. The storage device database module 178 may have information, such as in the form of a storage device database, stored thereon, related to individual storage devices 160(1)-(N), as well as clusters, groupings, or bins of storage devices. With regard to individual storage device 160(1)-(N) information, the storage device database module 178 may have information regarding one or more of the storage device age, storage device manufacturer, storage device serial number, storage device model type/number, storage device batch dates/numbers, storage device firmware versions, storage device interfaces, storage device AT Attachment (ATA) capabilities, storage device formats, number of read/write cycles, number of separate user allocations, etc., corresponding to one or more storage devices 160(1)-(N). In addition to identifier type information of the storage devices 160(1)-(N), as discussed, the storage device database module 178 may include measured data or metrics from individual storage devices 160(1)-(N). The measured data or metrics may be collected while storing data to the individual storage devices 160(1)-(N), while wiping or zeroing data to the individual storage devices 160(1)-(N), or while formatting the individual storage devices 160(1)-(N). The measured data or metrics may include mapping of bad or otherwise unusable blocks or sectors, measured seek times, measured data throughput rates, cyclic redundancy check (CRC) error rates, spin-up times, operating temperatures, or the like, of individual storage devices 160(1)-(N). In certain embodiments, one or more of the storage devices 160(1)-(N) may be configured with self-monitoring and reporting technology (S.M.A.R.T.) to collect the measurements and metrics, as discussed. Therefore, the storage devices 160(1)-(N), themselves, may, in certain embodiments, include hardware, software, and other infrastructure for self health monitoring and reporting. The measured data may be collected, organized, and stored in the storage device database module 178 by the processors 144, the storage device drivers 150 or any other element of the remote computing servers 140.

Further still, the storage device database module 178 may include information on clusters, bins, or groupings of storage devices 160(1)-(N). In other words, the storage device database module 178 may have stored thereon information pertaining to metrics associated with a collection of related storage devices 160(1)-(N). Individual storage devices 160(1)-(N) may be associated with a cluster based, at least in part, on any suitable identifier, such as manufacturer, model number, date of manufacture, storage capacity, or the like. In certain aspects, a storage device 160(1)-(N) may be associated with more than one cluster. For example a particular storage device may be associated with a cluster for a particular manufacturer, where the cluster may have storage devices of various storage capacities. The same storage device 160(1)-(N) may further be associated with another cluster related to a particular storage capacity range and that storage capacity range cluster may include devices from various manufacturers. Each of these clusters or groupings of storage devices 160(1)-(N) may have aggregated metric values associated therewith. For example, storage devices from a particular manufacturer may be allocated to a cluster, and the storage device database module 178 may have aggregated metrics associated with the cluster, such as, for example, mean seek times, median bad blocks, or $90^{th}$ percentile level of data throughput, etc. of storage devices 160 in the cluster.

It should further be noted that the storage device database module 178 may include information derived from collected data during one or more of storage device usage, storage device wiping, storage device wiping verification, or storage device formatting. An example of a derived metric may be a derivation of failed block erasure probability based on a partial scan verification of wiping of a particular storage device 160. In this case, it may be determined how many blocks have not been wiped or erased properly on the storage device based on a partial scan of the zeroed or wiped sectors. Based, at least in part, on the number of incorrectly wiped blocks and the percentage of all wiped blocks that were scanned, the processor may be able to determine a probability of improperly wiped blocks or generate an estimate of the total number of blocks that may have been improperly wiped on the storage device 160. Such derived metrics, including probabilities, probability density functions, projections, interpolations, extrapolations, and the like may be available and accessible by the processors 144 from the storage device database module 178. In this case, derived metrics may be associated with individual storage devices, clusters of storage devices, or both.

The storage device database module 178 may further include threshold values or threshold conditions associated with either or both of the individual storage device 160 metrics or clusters of device metrics. The threshold values or conditions corresponding to the metrics may be used for comparison to collected data from individual storage devices 160 to make various determinations, such as if the storage device exhibits signs or indications of ill health. In certain embodiments, the threshold values may correspond to upper limits or lower limits of a particular metric beyond which a storage device may require additional scrutiny during a wiping or erasing process. In other words, if measurements of one or more metrics on a particular storage device 160 are beyond a threshold value or otherwise outside of a threshold condition, it may indicate that the storage device 160 should be scrutinized to a greater degree than other storage devices 160 during the wiping or erasing verification stage of the storage device 160. For example, if the number of bad blocks on a particular storage device 160 exceeds a threshold value for bad blocks associated with a cluster to which the particular storage device 160 belongs, then the storage device 160 may be subject to a full scan to verify wiping of the storage device rather than a partial scan. In another example, if the age of a particular storage device 160 exceeds a threshold value for the age of a device associated with that particular storage device 160, then the storage device 160 may be subject to a full, rather than a partial, scan to verify that the storage device 160 has been erased or wiped completely or adequately.

The storage device database module 178 may further include information pertaining to known deficiencies or defects of particular clusters of storage devices. For example, it may be known from publicly available information or from a manufacturer that a particular model of storage device exhibits premature failure or unreliable wiping or erasure. Therefore during a wiping process of a storage device 160 that is part of the cluster that exhibits unreliable wiping, the processor 144 may access the storage device database module 178 in the memory 170 and may determine that for the storage device 160, a full wiping verification scan should be run, since there is a history, or otherwise an indication of unreliable wiping of the storage devices 160 associated with that cluster.

It will also be appreciated that the storage device database module 178 may be updated as new data becomes available. Contents of the storage device database module 178, including individual storage device measured metrics, aggregated metrics associated with a cluster of storage devices, storage device cluster related flags, warnings or indications of unreliability, or threshold values, may be determined and updated in a real-time manner. Alternatively, the storage device related values and metrics may be updated on a non-real-time manner, at predetermined times or at predetermined frequencies, such as daily or weekly.

In certain embodiments, when a storage device is used by a user 102, such as in a remote fashion, values associated with a metric may be collected during the storage and/or retrieval of data from a particular storage device 160. The values that are collected during usage of the storage device 160 may, in some cases, be used to update the storage device database module 178. For example, if during operation of a particular storage device 160, a bad block is discovered, then the storage device drivers 150 and/or the processors 144 may update the storage device database module 178 to reflect the discovery of the bad block by incrementing the number of bad blocks associated with that storage device 160, record the location or address of the discovered bad block, and/or by updating any other suitable information associated with the discovery of the bad block. Additionally, data collected during usage of the storage device 160 may be used to update aggregated data associated with one or more storage device clusters. Continuing with the example of discovery of a bad block on the particular storage device 160, data associated with each cluster of storage devices to which that particular storage device belongs may be updated according to the discovery of the bad block.

Although an example of updating individual storage device 160 metrics or storage device cluster metrics based, at least in part, on data collected during usage of the storage device was discussed, it will be appreciated that individual storage device 160 or storage device cluster metrics may be updated as a result of data collected during wiping of the storage device 160, verifying the wiping of the storage device 160, or formatting (or reformatting) of the storage device 160. For example, access time data may be collected contemporaneously with wiping a particular storage device 160. That access time data may be used by the processors 144 to update metrics associated with the storage device 160 that was wiped and any or some of the clusters with which the wiped storage device 160 is associated. As another example, after wiping a particular storage device 160, a verification process may be run as a full scan of the blocks that were wiped on the storage device 160 to determine how many of the blocks of the storage device 160 were properly wiped. The information garnered from the verification step may be used by the processors 144 to update the storage device database module 178. The data from the verification process may further be used to update aggregated data metrics associated with clusters to which the verified storage device 160 belongs. For example, an average number of improperly wiped blocks metric for a cluster to which the storage device 160 belongs may be updated based on the new verification data collected during the full scan of the storage device 160.

It will be appreciated that in certain aspects, data associated with a metric may be generated based, at least in part, by the processors 144 and stored in the storage device database module 178. In other words, the values and data stored in the storage device database module 178 may be derived from measurements or associated with measurements. For example, the processors 144 may derive a probability of blocks that are likely to fail to be wiped properly based on a partial scan verification of wiping of a particular storage device 160. The probability assessment, in this case, may be an estimate based on measured data and derived based on the measured data. The probability assessment or other derived metric values associated with individual storage devices 160 or clusters of storage devices 160 may be determined by the processors 144, based at least in part, on measurements available to the processors 144, and the derived metrics may be stored in the storage device database module 178 by the processors 144.

Additionally, threshold values associated with measured metrics may be updated on the storage device database module 178 based, at least in part, on measurements associated with one or more storage devices 160. In other words, as the correlation between two or more metric changes, the threshold levels associated with the two or more metrics may also be changed to account for the changes. For example, if it is determined by the processors 144 using fresher or more recent data that a lower threshold level of a particular metric, such as bad blocks, should be used to determine if a full scan should be performed to verify the wiping of a certain cluster of storage devices, then the corresponding threshold level may be adjusted accordingly.

Illustrative Processes

Figure 2:
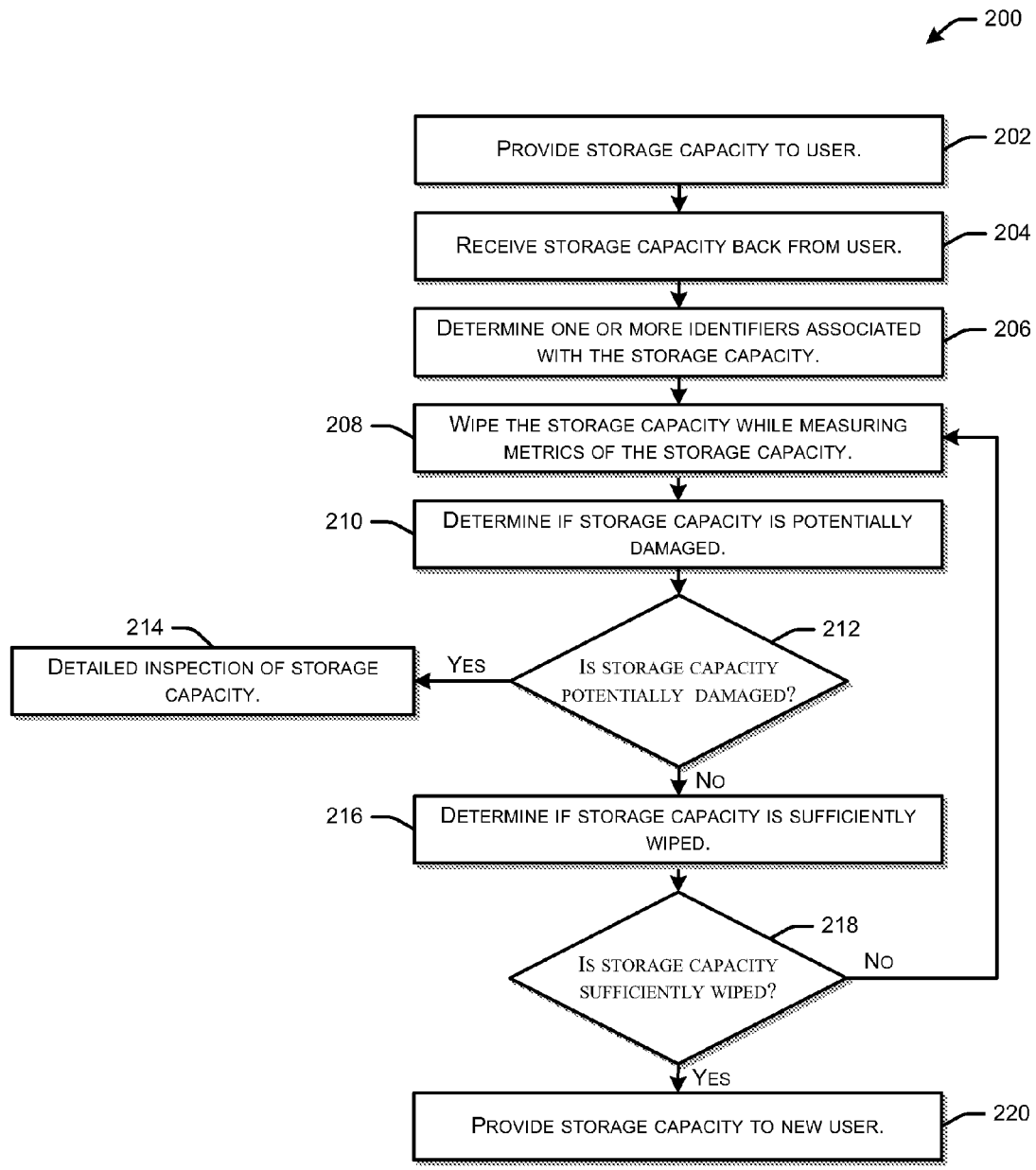
FIG. 2 is a flow diagram illustrating an example method for providing storage capacity to a user, in accordance with embodiments of the disclosure.

Referring now to FIG. 2, an example method 200 for providing storage capacity to a user in accordance with embodiments of the disclosure is illustrated. This method 200 may be implemented by the remote computing servers 140. At block 202, storage capacity may initially be provided to a user. In other words, a virtual machine instance 142 with associated computing resources and/or data storage resources may be provided by the remote computing servers 140 to the user. The user may selectively store data on some or all of the provided storage capacity. Therefore, some or all of the blocks associated with the storage capacity allocated to the user may have data written thereon. In one aspect, when the storage capacity is provided to the user, the storage devices 160 are located along with the remote computing servers 140, and, therefore, the storage capacity is provided at a remote location from the user devices 104. The storage capacity allocated to a particular user may be allocated from just one storage device, a portion of one storage device, more than one storage device, portions of more than one storage device, one or more storage devices and one or more portions of storage devices, or any suitable combinations of whole and partial storage devices. In one aspect, the storage device management module 176 and instructions stored thereon may be executed by the processors 144 to allocate, track, and manage the storage devices 160, or portions thereof, which constitute the storage capacity that is allocated to the user. In certain embodiments, the storage capacity allocated to the user may be borrowed, rented, leased or purchased from a provider of remote computing services. The provider of the remote computing services may be an individual or entity that owns, operates, rents, leases, or otherwise controls the remote computing servers 140.

At block 204, the storage capacity that was provided to the user is received back from the user. In other words, the storage capacity that was allocated to the user in block 202 is no longer needed by the user and, therefore, is returned to the provider. Therefore, the virtual machine instance 142 may be terminated for the user by the remote computing servers 140. In some embodiments, the user may no longer borrow, rent, lease, purchase, or otherwise control the storage capacity that it returns and no longer uses. In certain embodiments, the user may provide an indication that the user is returning the storage capacity to the provider of remote computing services and back to the remote computing servers 140. Once the storage capacity is received back or an indication of the storage capacity being returned to the remote computing servers 140 is received, the storage capacity may be prepared for provision to another user. At this point, some or all of the storage capacity may have been written to and may be dirtied with data from usage by the user to which the storage capacity was provided. In other words, one or more blocks of the storage capacity may be dirtied or may contain data thereon. It should be noted that the dirtied blocks may reside on one or more individual storage devices 160(1)-(N). It should also be noted that if the storage capacity is spread across more than one storage device 160(1)-(N), the storage devices 160 may be of similar types or dissimilar types. In one aspect, upon receiving the storage capacity back from the user, the processors 144 may receive a request to erase or wipe the storage capacity and, therefore, the one or more storage devices 160 associated with the storage capacity.

At block 206, one or more identifiers of the storage capacity may be determined. This may entail the processors 144 cooperating with the storage device management module 176 and the instructions and data stored thereon and determining the storage devices 160 corresponding to the storage capacity that was allocated to the user. Once the storage devices associated with the storage capacity are identified, one or more other identifiers or attributes associated with each of the storage devices may be identified. The identification of the identifiers or information about each of the storage devices 160 associated with the storage capacity may be via a look-up table stored in the memory 170, such as in the storage device management module 176 or the storage device database module 178. The identifiers or information may include, for example, storage device age, storage device manufacturer, storage device serial number, storage device model type/number, storage device batch dates/numbers, storage device firmware versions, storage device interfaces, storage device AT Attachment (ATA) capabilities, storage device formats, number of read/write cycles, or number of separate user allocations, for each of the devices.

At block 208, the storage capacity may be wiped while measurements of metrics may be performed on the storage devices associated with the storage capacity. In one aspect, zeros may be written to all of the blocks of the storage capacity and, therefore, all of the allocated blocks of the storage devices associated with the storage capacity. The measurements may include mapping of bad or otherwise unusable blocks of the storage devices 160, seek times, data throughput rates, cyclic redundancy check (CRC) error rates, spin-up times, operating temperatures, or the like.

At block 210, it is determined based, at least in part, on the measured metrics, if any of the devices of the storage capacity are damaged. This determination may be based on comparing the measured metrics to one or more corresponding respective threshold values. In certain embodiments, threshold values associated with the measured metrics for determining if a storage device is damaged may be stored on the memory 170, such as in the storage device database module 178 and may be accessed by the processors 144. At block 212, if the storage capacity is potentially damaged, then the method 200 may proceed to block 214 to conduct a detailed inspection of one or more of the storage devices associated with the storage capacity. The detailed inspection of the storage capacity may entail one or more of a block-by-block inspection of the potentially damaged storage devices 160, a physical inspection by a human of the potentially damaged storage devices 160, or a reformatting and measurement of metrics of the potentially damaged storage devices 160. In certain aspects, if it is determined that the potentially damaged devices 160 are in fact damaged, the damaged devices may be discarded or recycled.

At block 212, if the storage capacity or the constituent storage devices are not deemed to be potentially damaged, then at block 216, it is determined if the storage capacity has been sufficiently wiped. The determination may be based on a partial scan or full scan of the storage devices associated with the storage capacity. The details of determining if the storage capacity is sufficiently wiped will be discussed in greater detail in conjunction with FIG. 3. At block 218, if the storage capacity is not sufficiently wiped, then the method 200 may return to block 208 to wipe the storage capacity and the storage devices associated therewith. Alternatively, only the storage devices that have been deemed to be insufficiently wiped at block 216 may be re-wiped. While wiping or rewiping one or more of the storage devices 160 associated with the storage capacity, measurements may be collected of one or more metrics to determine if the storage device is potentially damaged or what type of wiping verification may be performed on the storage device. At block 218, if it is deemed that the storage capacity on each of the associated storage devices is sufficiently wiped, then the storage capacity may be provided to another user at block 220. In other words, a virtual machine instance 142 may be offered to a new user by the remote computing servers 140. The storage capacity associated with the new instance 142 may be a storage capacity that has been wiped and verified after usage in a previous instance 142. By wiping and verifying the wiping of the storage capacity, the data confidentiality and data security of the first user is ensured while providing the previously used storage capacity to a new user.

It will be appreciated that although the methods as shown herein are discussed in the context of remote computing or cloud computing services, the methods for erasing storage devices may be applied in any suitable application other than remote computing services. In certain embodiments, the methods descried herein may be used to wipe storage devices that are not at remote locations. In fact, the method 200 may be applied to a personal computer or otherwise non-remote computing application and setting.

Figure 3:
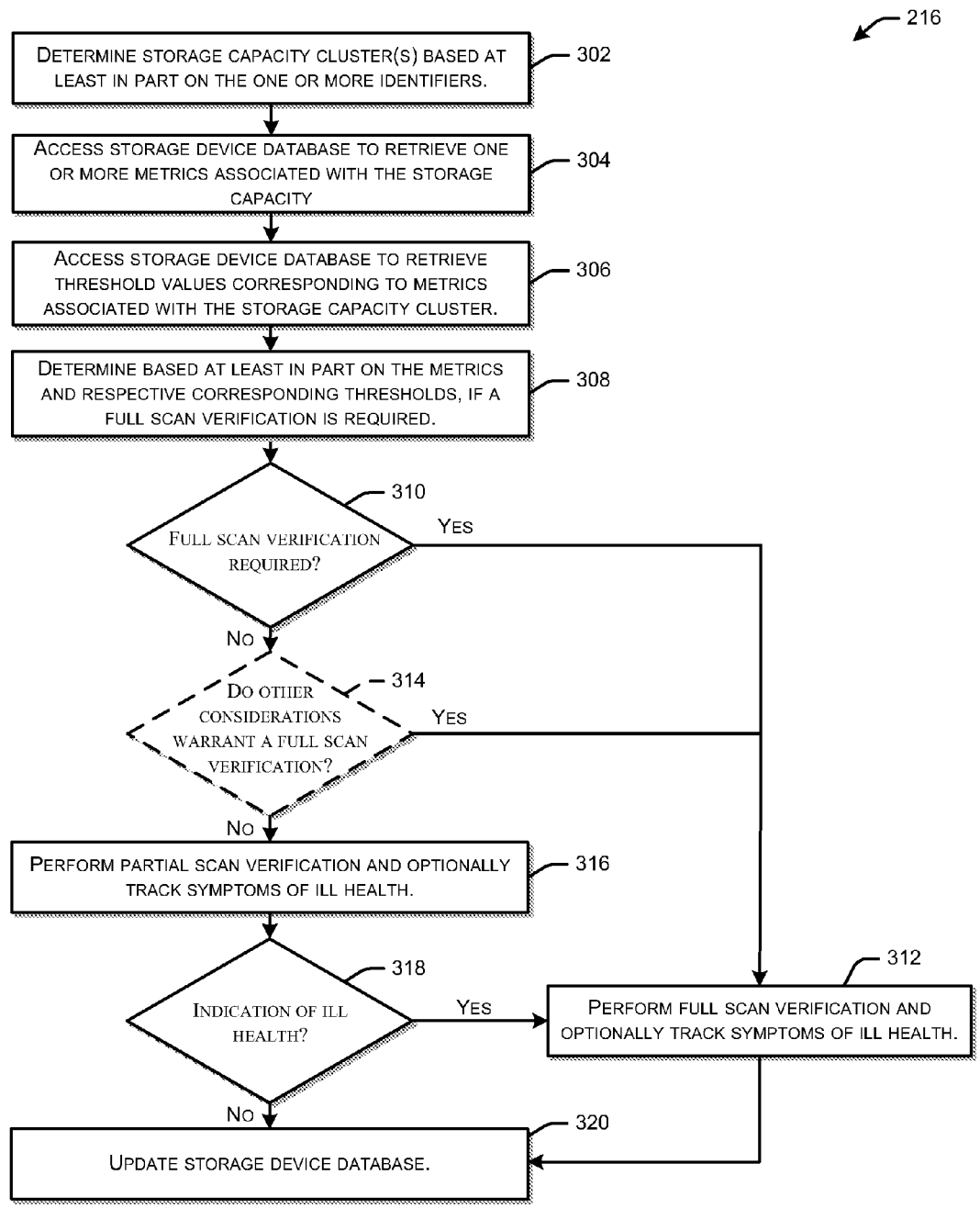
FIG. 3 is flow diagram illustrating an example method for verifying the wiping of a storage capacity, in accordance with embodiments of the disclosure.

Referring now to FIG. 3, an example method 300 for verifying the wiping of the storage capacity is illustrated. Method 300 may be performed by the remote computing servers 140, and the method 300 may be one example implementation of block 216 of the method 200 of FIG. 2.

At block 302, the storage device cluster(s) to which the storage devices 160 of the storage capacity are associated are identified based, at least in part, on the one or more identifiers determined at block 206 of method 200 as illustrated in FIG. 2. It should be noted that each storage device associated with the storage capacity may have one or more clusters or bins associated therewith. For example, a particular storage capacity may have three storage devices 160 associated therewith. The first storage device 160(1) may be associated with clusters "Seagate," "2 Tb," and "3 Platter." The second storage device 160(2) may be associated with clusters "Hitachi," and "3 TB." The third storage device 160(3) may be associated with clusters "Seagate" and "2.5 inch form factor." In one aspect, the determination of the clusters associated with each of the storage devices 160 associated with the storage capacity may be performed by the processors 144 by accessing a look-up table stored in the storage device management module 176 or the storage device database module 178.

Once one or more clusters are identified for each storage device 160, at block 304, the storage device database module 178 may be accessed to retrieve one or more metrics of the storage devices associated with the storage capacity. The metrics may include, for example, the age of the storage device, the number of times the storage device has been wiped, the storage device access times, or the like. In certain embodiments, these metrics may be historical data, such as previous measurement data or tracking data, which may be stored in the storage device database module 178 and associated with the corresponding respective storage device 160 and accessible by the processors 144. These metrics may be updated with new data or measurements that may be collected for storage devices 160, such as during the wiping process at block 208 of the method 200 as illustrated in FIG. 2.

At block 306, the storage device database module may be accessed to retrieve one or more threshold values corresponding to the clusters with which the storage devices of the storage capacity are associated. In this case, the threshold values may correspond with the metrics that were accessed for the storage devices in block 304 or metrics that were measured in block 208 of method 200 of FIG. 2. In certain embodiments, the threshold values may indicate a level beyond which or below which a metric associated with a particular storage device 160 may indicate that the storage device should be more thoroughly verified to determine if the storage device 160 has been properly wiped. For example, for a cluster of "Seagate," a threshold value for bad blocks may be retrieved. If a particular storage device 160 falls into the cluster "Seagate," and is measured to have a number of bad blocks that exceed the threshold value for the number of bad blocks, then that may indicate that the storage device 160 requires additional scrutiny during the wiping verification process. In certain embodiments, a threshold value for a metric may be retrieved for each cluster to which a particular storage device 160 is associated. For example, a particular storage device may be associated with clusters "Hitachi" and "3 TB." In this case, a threshold value for the access time may be retrieved for the cluster "Hitachi," and a threshold value for the number of bad blocks may be retrieved for the cluster "3 Tb." In other embodiments, there may be multiple threshold values, corresponding to multiple metrics, for each cluster to which a particular storage device 160 is associated. For example, a cluster "4 Platter" may have threshold values of seek time and data throughput associated therewith.

At block 308, it may be determined based, at least in part, on the metrics, and the respective corresponding threshold values if full scan verification is required for the storage devices 160 associated with the storage capacity. In one aspect, the processors 144 may compare the metrics to the respective corresponding threshold values as retrieved at block 306. In certain embodiments, if one of at least one metric associated with a storage device is outside the bounds, either greater than or less than the respective corresponding threshold value, it may be determined that the storage device should be subjected to a full scan, where each of the erased blocks are verified to be erased. For example, if the number of bad blocks for a particular storage device is measured during the wiping process to be less than the threshold value associated with bad blocks for a cluster in which the storage device 160 belongs, but the access speed is less than the corresponding threshold value for a storage device cluster to which the storage device belongs, then the storage device 160 may still be considered to need a full scan verification. Stated another way, even though one of the metrics associated with the storage device 160 is within the threshold level (in this case, the number of bad blocks), another metric (in this case, the access speed), may be outside of the threshold limits and, therefore, prompt a determination that the wiping of the storage device should be verified via a full scan. In certain other embodiments, if a predetermined number or predetermined percentage of at least one metric associated with a storage device is outside the bounds, either greater than or less than the respective corresponding threshold value, it may be determined that the storage device 160 should be subjected to a full scan, where each of the erased blocks is verified to be erased. For example, referring to the previous example, a determination that the storage device 160 should be verified by a full scan may be prompted if both the bad blocks and the access times are out of the bounds set by the respective corresponding threshold values. In one aspect, the processors may access a threshold condition corresponding to a particular storage device 160 and a particular metric associated with that storage device 160. The threshold condition may include one or more threshold values and criteria for violating the threshold values. For example, the threshold condition may provide an indication of an upper bound, a lower bound, or a range for a particular metric, beyond which the processors 144 may determine that the corresponding storage device 160 should be subject to a full scan verification for wiping.

At block 310, if full scan verification is required, then the method 300 may proceed to block 312 to perform a full scan verification and optionally track symptoms of ill health of the storage device 160. The symptoms of ill health may be measurements that are collected or tracked during the verification process. For example, the symptoms of ill health may include access times, scan times, data throughput rates, or bad blocks/sectors that are outside of pre-established specifications. In one embodiment, a full scan verification may entail verifying the erasure of all the blocks that were dirtied during the usage of the storage capacity and associated storage devices 160. In other embodiments, a full scan verification may entail verifying erasure of all of the blocks of the storage capacity of one or more of the associated storage devices 160. A determination that the one or more storage devices 160 are sufficiently wiped may be provided if a predetermined percentage of the blocks of the storage device had been erased.

At block 310, if full scan verification is not required, then at optional block 314, it may be determined if any other considerations, other than those based on the metrics and associated threshold values, warrant a full scan verification of the storage capacity of one or more of the associated storage devices 160. These other considerations may include random selection of storage devices 160 to fully scan to verify the efficacy of the methods 200 and 300 disclosed herein. Such random scans may provide information regarding verification confidence associated with partial scan verification of storage devices 160. Another factor to force a full scan may include the availability of full scan resources that are not required by other processes and, therefore, may be used to conduct a more thorough full scan rather than sit idle. Such resources may include processors 144 bandwidth, availability of free capacity in the memory 170, or any other suitable factors and/or resources. Yet another factor to prompt a full scan of a storage device may be if the storage device has been subjected to only partial scans in the recent past, and it is deemed prudent to conduct a full scan. In other words, a particular storage device 160 may be subject to a full scan verification of wiping after a predetermined number of previous partial scan verifications of wiping. Still another factor to prompt a full scan of the storage device 160 may be if the storage device 160 is not scheduled to immediately go back into service and is provided for storage to a new user or entity. In that case, there may be time to perform a full scan of the storage device 160 when adequate scanning verification resources are available. Another factor to prompt a full scan may be if other storage devices within the storage device cluster of the particular storage device 160 exhibit early failures. In that case, all, or perhaps a greater percentage of, storage devices within the cluster with a relatively high percentage of failures may be subjected to full scan verifications, even if metrics associated with a particular storage device 160 are not out of the bounds set by any specific threshold value corresponding to any specific metric.

If at block 314 it is determined that a full scan verification is warranted, then the method 300 may proceed to block 312 to conduct a full scan verification of the storage capacity of one or more constituent storage devices. If at block 314 it is determined that a full scan verification is not warranted, then at block 316, a partial scan verification may be performed and, optionally, symptoms of ill health of the storage device may be tracked. In certain embodiments, the partial scan verification may scan a subset of all of the dirtied blocks of a storage device 160 associated with the storage capacity to determine if the storage device 160 is sufficiently wiped. In certain other embodiments, the partial scan verification may scan a subset of all of the blocks of a particular storage device 160. The subset of the blocks of the storage device 160 that are scanned during the partial scanning may be a predetermined percentage of the total number of blocks of the storage device. Alternatively, the subset of the blocks that are scanned may be a predetermined number of blocks. The distribution of the subset of blocks selected for the partial scan may be according to a predetermined template. For example, the distribution may be according to any suitable distribution function or sequence, such as, for example, a Fibonacci type pattern. Alternatively, the distribution of the subset of blocks that are scanned may be determined in-situ while conducting the partial scan by one or more of a random process with memory, a memoryless random process, a random walk, a Markov process, a Monte Carlo process, or combinations thereof. Indications or symptoms of ill health of the storage device during the partial scanning process may include access times, scan times, data throughput rates, or bad blocks/sectors, or any other suitable metrics that are outside of pre-established specifications. A determination that the storage device is sufficiently wiped may be provided if a predetermined percentage of the blocks of the storage device had been erased.

If there is an indication of ill health during the partial scanning verification at block 318, then the method 300 may proceed to perform a full verification scan at block 312. In certain embodiments, the partial scanning verification may be terminated during the verification process if an indication of ill health is detected, and the method 300 may proceed to block 312. In other embodiments, the method 300 may proceed to block 312 only after the partial scan verification is complete, even if an indication of ill health of the storage device was detected part of the way through the partial scan process.

If at block 318, there is no indication of ill health of the storage capacity of the storage devices 160 associated with the storage capacity, then the method may proceed to block 320 where the storage device database module 178 may be updated. A detailed discussion regarding the updating of the storage device database module 178 is provided in conjunction with FIG. 4. In one aspect, the storage device database module 178 may be updated with one or more of storage device specific metrics, storage device cluster specific metrics, or threshold values associated with storage device cluster specific metrics. The updated values may be used in subsequent iterations of execution of the methods 200 (FIG. 2) and 300 (FIG. 3). In certain embodiments, the metrics and associated threshold values may change when storage devices are subjected to a partial or full wiping verification. Additionally, revised and/or updated metrics and threshold values may provide for improved analysis and estimation, and potentially more accurate determination of whether a storage device should be subjected to a partial or full wiping verification scan. Alternatively or in addition, revised and/or updated metrics and threshold values may provide for improved predictive capabilities of a partial scan with regard to whether a storage device has been sufficiently wiped.

It will be appreciated that in certain embodiments, the process of verifying if a storage device has been properly wiped may be relatively time consuming or may require relatively high levels of computing resources. Accordingly, if the wiping verification process can be reduced to a partial scan of the storage device with predictive analysis of whether the storage device has been sufficiently wiped, then the verification process may require relatively less time and/or relatively less computing resources.

It will be appreciated that in the above discussion of the wiping verification method 300, the storage capacity may include one or more storage devices 160 associated therewith. In other words, the storage capacity may be distributed across more than one storage device 160. In this case, it will be appreciated that each storage device may be considered independently from other storage devices associated with the storage capacity. Therefore metrics associated with each of the storage devices 160 may be measured, retrieved, and/or determined independently and independently compared to respective corresponding threshold values for each of the storage devices 160 that constitute the storage capacity. It, therefore, follows that one or more of the storage devices 160 associated with the storage capacity may be subjected to a partial scan wiping verification while one or more other storage devices 160 associated with the storage capacity may be subjected to a full scan wiping verification.

It should be noted that the method 300 may be modified in various ways in accordance with certain embodiments. For example, one or more operations of the method 300 may be eliminated or executed out of order in other embodiments. Additionally, other operations may be added to the method 300 in accordance with other embodiments.

Figure 4:
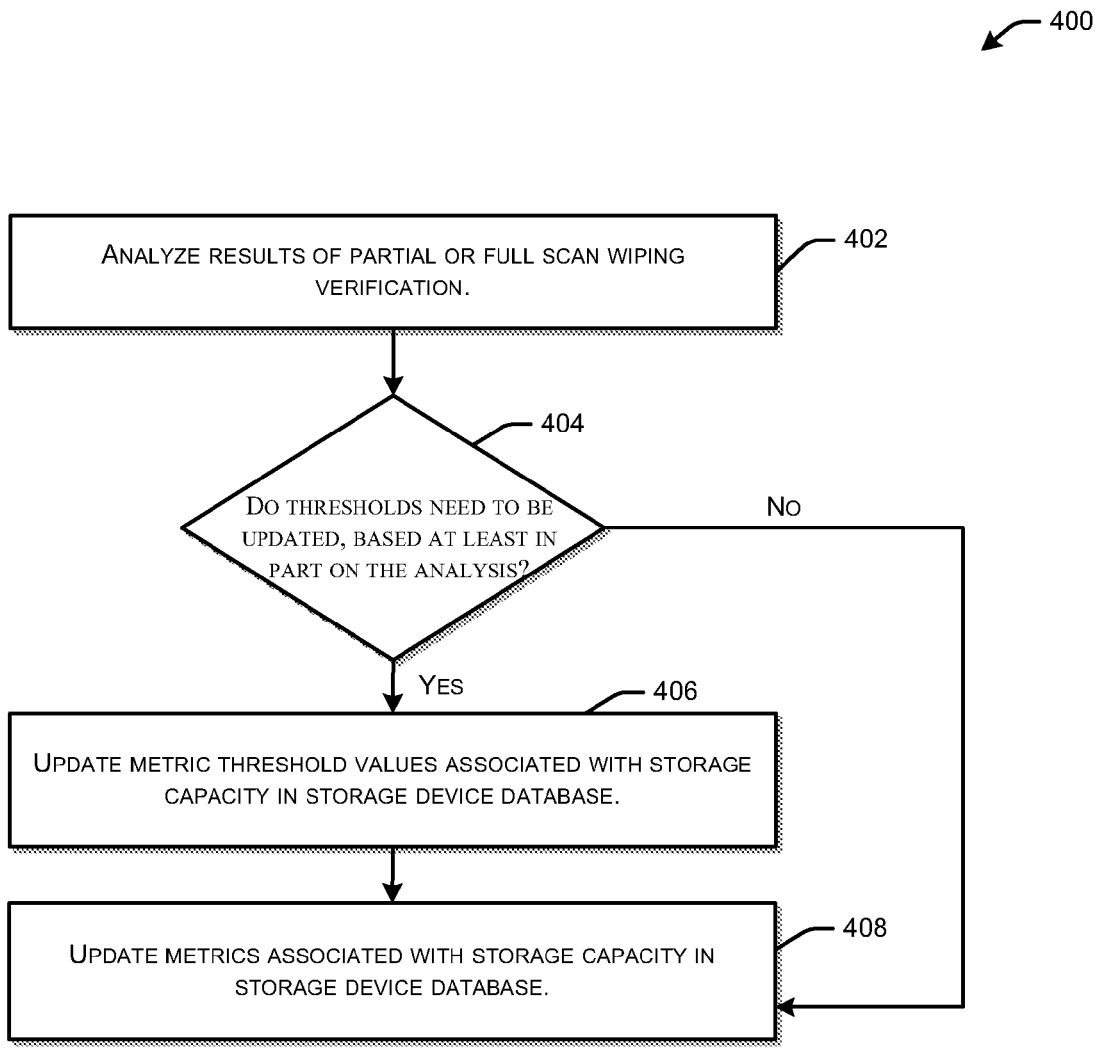
FIG. 4 is a flow diagram illustrating an example method for updating a storage device database, in accordance with embodiments of the disclosure.

Referring now to FIG. 4 an example method 400 for updating metrics associated with the storage capacity is illustrated. The method 400 may be executed by the remote computing servers 140. In one aspect, method 400 may be an example implementation of block 320 of the method 300 of FIG. 3. At block 402, the results of a partial or full scan wiping verification may be analyzed. In one aspect, the analysis may be carried out by the processors 144. The analysis may involve reviewing the data or measurements collected during the wiping process. For example, for each device associated with the storage capacity, it may be determined if the wiping was sufficiently complete, how many blocks were not sufficiently wiped, how many blocks are damaged, or other relevant information. The analysis may further compare a partial scan and a full scan on the same or similar storage device(s) 160 to determine if there is sufficient consistency between the results of a partial scan and a full scan verification. For example, it may be determined if a partial scan verification provided a false indication that the storage device was sufficiently wiped when, in fact, it was not sufficiently wiped. In such a case, it may be desirable to use a more stringent threshold value of a particular metric so that when more devices of a particular cluster are found to have false indications of sufficient wiping, they are subjected to a full scan verification of wiping. In other words if a partial scan verification of wiping in a particular cluster or group of clusters is insufficient, then it may be desirable to subject more of the storage devices from those cluster(s) to a full scan verification, so that there are not as many false indications of wiping.

In another example, it may be determined that partial scan verifications for a particular cluster or groups of clusters are providing relatively accurate results when compared to full scan verifications of the same or similar storage devices from the those cluster(s). In that case, it may be determined that too many storage devices associated with those cluster(s) are being subjected to full scan verifications of wiping. As a result, it may be determined that fewer devices should be subjected to full scan verifications from those cluster(s), and it may be desirable to adjust one or more metric threshold values associated with those cluster(s) so that fewer storage devices from those cluster(s) are subjected to full scan verifications for wiping. In this case metric threshold values may be adjusted to be less stringent so that fewer devices are found to be beyond (either above or below) the threshold values of one or more metrics associated with the cluster(s) with which the storage devices are subjected to too many full scan verifications. Therefore, there may be an opportunity, in that case, to save time and computing resources for preparing storage devices for subsequent users of the storage devices.

At block 404, it may be determined, based at least in part, on the analysis, if metric thresholds should be updated. If the threshold needs to be updated at block 404, the threshold values corresponding to one or more metrics may be updated in the storage device database module 178 at block 406. In this case, threshold values may be adjusted either up or down. Indeed, threshold values may be adjusted downward to subject the same or more storage devices to a full scan verification, upward to subject the same or more storage devices to a full scan verification, downward to subject the same or fewer storage devices to a full scan verification, or upward to subject the same or fewer storage devices to a full scan verification. In one aspect, the processors 144 may access the storage device database module 178 in the memory 170 and update the appropriate threshold levels of the appropriate cluster(s) as determined at block 406.

If at block 404, the threshold values do not need to be updated then the method 400 may proceed to block 408, where metrics associated with the storage devices of the storage capacity may be updated in the storage device database module 178. Also, the method 400 proceeds to block 408 from block 404, [is 404 correct?] after threshold values have been updated in the storage device database module 178. The metrics may be updated based at least in part on data or measurements collected during the usage, wiping, wiping verification, or formatting of the one or more storage devices 160 associated with the storage capacity. For example, the number of bad blocks/sectors on a particular storage device may be updated based on the latest data available. As a further example, average seek times may be updated based on averages generated using previously stored metrics in the storage device database module 178, as well as newly measured data.

Embodiments may be provided as a computer program product including a non-transitory machine-readable storage medium having stored instructions thereon (in compressed or uncompressed form) that may be used to program a computer (or other electronic device) to perform processes or methods described herein. The machine-readable storage medium may include, but is not limited to, hard drives, floppy diskettes, optical disks, CD-ROMs, DVDs, read-only memories (ROMs), random access memories (RAMs), EPROMs, EEPROMs, flash memory, magnetic or optical cards, solid-state memory devices, or other types of media/machine-readable medium suitable for storing electronic instructions. Further, embodiments may also be provided as a computer program product including a transitory machine-readable signal (in compressed or uncompressed form). Examples of machine-readable signals, whether modulated using a carrier or not, include, but are not limited to, signals that a computer system or machine hosting or running a computer program can be configured to access, including signals downloaded through the Internet or other networks. For example, the distribution of software may be an Internet download.

Although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without user input or prompting, whether these features, elements, and/or steps are included or are to be performed in any particular embodiment.

That which is claimed:

1. A method, comprising:
receiving, by one or more computers comprising one or more processors, a request to terminate a first virtual machine instance;
identifying, by the one or more computers, a storage device associated with a storage capacity of the first virtual machine instance;

wiping, by the one or more computers, the storage device, wherein a metric associated with the storage device is recorded during the wiping;
determining, by the one or more computers, that the storage device is not damaged;
associating, by the one or more computers, the storage device to a corresponding cluster of storage devices based at least in part on the identification of the storage device;
receiving, by the one or more computers from a storage device database, threshold value corresponding to the metric, wherein the threshold value is generated using previously collected data corresponding to the metric from a plurality of previously wiped storage devices, and wherein the threshold value corresponds to the corresponding cluster;
determining, based at least in part on a comparison of the metric and the corresponding threshold value, if the storage device is to be partially scanned or fully scanned to verify wiping of the storage device, wherein a partial scan verification is executed if the metric is less than the threshold value and a full scan verification is executed if the metric is greater than the threshold value;
verifying, by the one or more computers and based at least in part on one of the partial scan verification or the full scan verification for the storage device, that the storage device is sufficiently wiped; and
associating, by the one or more computers, the storage device with a second virtual machine instance.

2. The method of claim 1, wherein identifying the storage device associated with the storage capacity further comprises accessing a storage device management module.

3. The method of claim 1, wherein the at least one metric associated with the storage device comprises at least one of: (i) age of the storage device; (ii) seek times; (iii) data throughput rates; (iv) cyclic redundancy check (CRC) error rates; (v) spin-up times; (vi) operating temperatures; or (vii) number of bad blocks.

4. The method of claim 1, wherein wiping the storage device comprises zeroing each block of the storage device.

5. The method of claim 1, wherein wiping the storage device comprises zeroing only dirtied blocks of the storage device.

6. The method of claim 1, wherein determining that the storage device is not damaged comprises comparing the at least one metric associated with each storage device to a respective corresponding predetermined value.

7. The method of claim 1, wherein associating the storage device to the corresponding cluster of storage devices further comprises accessing the storage device database.

8. The method of claim 1, wherein the one or more threshold values comprises at least one of: (i) age of storage device threshold value; (ii) seek time threshold value; (iii) data throughput rate threshold value; (iv) cyclic redundancy check (CRC) error rate threshold value; (v) spin-up time threshold value; (vi) operating temperature threshold value; or (vii) number of bad block threshold values.

9. The method of claim 1, wherein the storage device is sufficiently wiped if data is erased from a predetermined percentage of blocks of the storage device.

10. The method of claim 1, further comprising storing data on the storage capacity after verifying the wiping of the storage device.

11. A system, comprising:
at least one memory that stores computer-executable instructions;
at least one processor configured to access the at least one memory, wherein the at least one processor is configured to execute the computer-executable instructions to:
identify a storage device;
determine a cluster associated with the storage device based at least in part on the identification of the storage device;
wipe the storage device and determine a metric associated with the wiping of the storage device;
retrieve a threshold value corresponding to the metric and the cluster; and
verify if the storage device is sufficiently wiped by using a full scan verification or a partial scan verification, wherein a partial scan verification is executed if the metric is less than the threshold value and a full scan verification is executed if the metric is greater than the threshold value.

12. The system of claim 11, wherein identifying the storage device comprises accessing a storage device management module.

13. The system of claim 11, wherein the metric comprises at least one of: (i) age of the storage device; (ii) seek times; (iii) data throughput rates; (iv) cyclic redundancy check (CRC) error rates; (v) spin-up times; (vi) operating temperatures; or (vii) number of bad blocks.

14. The system of claim 11, wherein wiping the storage device comprises zeroing each of the blocks of the storage devices.

15. The system of claim 11, wherein the threshold value associated with the storage devices comprises an upper bound value.

16. The system of claim 11, wherein retrieving the threshold value comprises accessing a storage device database.

17. The system of claim 16, wherein the at least one processor is further configured to update the threshold value in the storage device database.

18. At least one non-transitory computer-readable medium comprising computer-executable instructions that, when executed by one or more processors, executes a method comprising:
wiping a storage device and recording a metric associated with the storage device;
receiving a threshold value associated with the one or more metrics, wherein the threshold value is generated based at least in part on previously collected data corresponding to one or more metrics collected from a plurality of previously wiped storage devices;
verifying, using either a full scan verification or a partial scan verification, whether the storage device is sufficiently wiped, wherein the partial scan verification is selected if the metric is less than the threshold value or the full scan verification is selected if the metric is greater than the threshold value;
determining based, at least in part, on the verifying that the threshold value should be updated; and
updating the storage device database with an updated threshold value, based at least in part on determining that the threshold value should be updated.

19. The non-transitory computer-readable medium of claim 18, wherein identifying the storage device comprises accessing a storage device management module.

20. The non-transitory computer-readable medium of claim 18, wherein the metric comprises at least one of: (i) age of the storage device; (ii) seek times; (iii) data throughput rates; (iv) cyclic redundancy check (CRC) error rates; (v) spin-up times; (vi) operating temperatures; or (vii) number of bad blocks.

21. The non-transitory computer-readable medium of claim 18, wherein wiping the storage device comprises zeroing each block of the storage device.

22. The non-transitory computer-readable medium of claim 18, wherein the threshold value associated with the storage device comprises an upper bound value.

23. The non-transitory computer-readable medium of claim 18, wherein the method further comprises associating the storage device to a virtual machine instance.

24. A method, comprising:
   wiping a storage device and recording a metric associated with the storage device;
   receiving a threshold value associated with the metric; and
   verifying, based at least in part on either a full scan verification or a partial scan verification, whether the storage device is sufficiently wiped, wherein the partial scan verification is selected if the metric is less than the threshold value or the full scan verification is selected if the metric is greater than the threshold value.

25. The method of claim 24, wherein the method further comprises updating the storage device database based at least in part on at least one of the one or more metrics.

26. The method of claim 24, further comprising closing a first virtual machine instance before wiping the storage device.

27. The method of claim 24, further comprising providing a second virtual machine instance after verifying whether the storage device is sufficiently wiped.

* * * * *